United States Patent Office 3,096,338
Patented July 2, 1963

3,096,338
NEW DIAZAPOLYMETHINE DYES CONTAINING THREE HETEROCYCLIC RINGS
Johannes Dehnert, Ludwigshafen (Rhine), Germany, assignor to Badische Anilin- & Soda-Fabrik Aktiengesellschaft, Ludwigshafen (Rhine), Germany
No Drawing. Filed Apr. 4, 1961, Ser. No. 100,510
Claims priority, application Germany Apr. 9, 1960
7 Claims. (Cl. 260—299)

This invention relates to new dyes of the diazapolymethine series and to processes for the production of such dyes.

More specifically, the invention relates to dyes of the general formula:

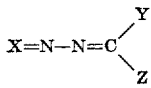

in which X, Y and Z denote nitrogenous heterocyclic radicals which may be alkylated on the nitrogen atoms, and to dye salts of these compounds. In the said formula, X may denote, for example, a thiazole, benzothiazole, 6-methoxybenzothiazole, 5-phenyl-1,2,4-triazole, 5-phenyl-1,3,4-triazole, indazole, 5-chloroindazole, 1,3,4-oxadiazole, pyrazole, tetrazole, cinnoline, pyridazine, quinoline or tetrazole radical, or a radical of the corresponding N-alkylated heterocycles; and Y and Z may represent, for example, benzimidazole, benzothiazole, 3-hydroxyquinoxaline, 1-phenylbenzimidazole, quinoline, pyridine, thiazole, benzoxazole, 5-chlorobenzimidazole or perimidine radicals, or radicals of the corresponding heterocycles alkylated on at least one nitrogen atom. A maximum of two of the heterocyclic radicals may have a nitrogen atom which has been quaternized by alkylation. Suitable alkyl groups with which the said alkylated, and possibly quaternized, nitrogen atoms may be combined include especially those having up to seven carbon atoms, as for example methyl, ethyl, chloroethyl, butyl and benzyl groups. Of these, the groups containing up to three carbon atoms are of special industrial importance. For economic reasons, the methyl group is preferred.

The invention furthermore relates to processes for the production of dyes of the said kind. These dyes are obtained (a) by coupling, in the presence of dehydrogenating or oxidizing agents, hydrazones of the general formula:

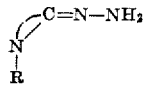

(I)

in which the group

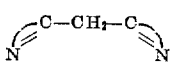

(as X above) denotes the radical of a five- or six-membered heterocycle and R denotes a hydrogen atom or a hydrocarbon radical, or salts of such hydrazones with heterocyclic compounds of the general formula:

(II)

in which the groups

(as Y and Z above) denote identical or different five- or six-membered heterocyclic rings which may bear further substituents or condensed-on rings, or with mono-N-alkylated derivatives of such compounds, and if desired reacting the resultant products with alkylating agents; or (b) by diazotizing amines of the general formula:

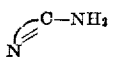

(III)

in which the group

denotes a five- or six-membered heterocyclic ring which may bear further substituents or condensed-on rings, coupling the resultant diazonium compounds with heterocyclic compounds of the general formula:

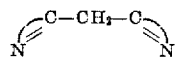

(II)

in which the groups

(as Y and Z above) denote identical or different five- or six-membered heterocyclic rings which may bear further substituents or condensed-on rings, or with mono-N-alkylated derivatives of such compounds, and if desired reacting the resultant products with alkylating agents.

Starting materials of the Formula I include: benzothiazolone-(2)-hydrazone, 3-methylbenzothiazolone-(2)-hydrazone, 6-methoxy-3-methylbenzothiazolone-(2)-hydrazone, 1-methylquinolone-(2)-hydrazone, and the corresponding compounds substituted on the nitrogen atom of the heterocyclic ring by methyl, ethyl, butyl, cyclohexyl, benzyl or phenyl radicals.

Starting materials of the Formula II include: di-[benzothiazolyl - (3)] - methane, di - [benzimidazolyl - (2)]-methane, di - [1 - phenylbenzimidazolyl - (2)] - methane, di - [quinolyl - (2)] - methane, di - [pyridyl - (2)]-methane, di - [thiazolyl - (2)] - methane, di - [benzoxazolyl - (2)] - methane, 3-hydroxyquinoxalyl - (2)-quinolyl - (2') - methane, 3 - hydroxyquinoxalyl - (2)-benzothiazolyl - (2') - methane, benzimidazolyl - (2)-5' - chlorobenzimidazolyl - (2') - methane, benzimidazolyl - (2) - benzothiazolyl - (2') - methane and benzimidazolyl - (2) - 3' - hydroxyquinoxalyl - (2') - methane. Most of the foregoing substances are known in the art. Substances which have not hitherto been described in the literature can be obtained by methods analogous to those for the production of the known substances. Of the unsymmetrically substituted methylene compounds specified above, 3 - hydroxyquinoxalyl - (2) - quinolyl-(2')-methane and 3-hydroxyquinoxalyl-(2)-benzothiazolyl-(2')-methane are obtainable by reaction of quinolyl-(2)- and benzothiazolyl-(2)-pyruvic acid esters, respectively, with 1,2-diaminobenzene; benzimidazolyl-(2)-5'-chlorobenzimidazolyl-(2')-methane and benzimidazolyl-(2)-benzothiazolyl-(2')-methane are obtained by fusing together 2-cyanomethylbenzimidazole with 4-chloro-1,2-diaminobenzene and 1-amino-2-mercaptobenzene, respectively; and benzimidazolyl-(2)-3'-hydroxyquinoxalyl-(2')-methane is prepared from 3-hydroxyquinoxalyl-(2)-acetic acid ethyl ester and 1,2-diamino benzene.

Starting materials of the general Formula III include diazotizable heterocyclic amines, preferably those which are derived from five-membered heterocycles and which may also contain condensed-on rings, for example benzene or naphthalene rings. Especially suitable diazo components include the amines of the following heterocyclic compounds: thiazole, benzothiazole, thiadiazole, oxadiazole, pyrazole, triazole, tetrazole, cinnoline, pyridazone and indazole.

The said heterocycles or ring systems containing heterocyclic rings may be substituted by substituents which are usual in azo dyes, for example by alkyl, alkoxy, aralkyl, aryl, nitro, acylamino, alkylsulfonyl, sulfonic acid amide or carboxylic acid amide groups, or by halogen.

If desired, a nitrogen atom in the compounds of the Formula II is alkylated by conventional methods with the aid of the calculated amount of alkylating agents, such as dimethyl sulfate, diethyl sulfate, toluenesulfonic acid methyl, ethyl or chloroethyl ester, methyl iodide, ethyl iodide, butyl bromide or benzyl chloride. The alkylation may be carried out, with or without the use of solvents or diluents, at temperatures between 0° and 180° C., if desired with the addition of acid-binding reagents, such as magnesium oxide, sodium methylate or dimethylformamide. 3-ethyl-2-[benzothiazolyl-(2')-methyl]-benzothiazolium iodide is an example of a product formed from a compound of the Formula II by alkylation.

The diazapolymethine dyes may also be alkylated in analogous manner using an excess of alkylating agent, in which case dye salts of different degrees of water solubility are obtained. The above-mentioned alkylating agents, for example, may be used for this purpose, dimethyl sulfate and diethyl sulfate being especially suitable. Of the latter two alkylating agents, dimethyl sulfate gives the better results.

By the above methods (a) or (b), dyes of the general formula:

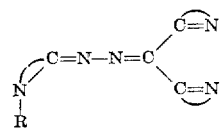

are obtained, in which R and the groups

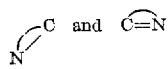

have the meanings given above. If compounds of the Formulae I, II and III which are N-alkylated in the heterocyclic ring are used as starting materials, dye salts are obtained in which the nitrogen atoms of the heterocycles may be partly or completely alkylated. If alkylation is effected after coupling in the presence of a base, such as magnesium oxide, N-peralkylated dye salts of the formula:

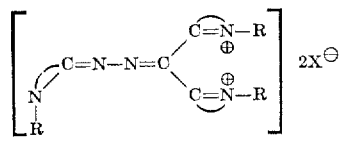

or of the mesomeric formula:

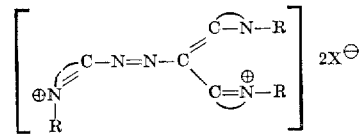

are obtained. The anion X$^\ominus$ in the above dye salts may be, for example, a chloride, bromide, iodide, nitrate, perchlorate, sulfate, phosphate, tetrachlorozincate, tetrabromozincate, tetrafluoroborate, toluenesulfonate or, preferably, methyl sulfate ion.

The dyes according to this invention and the alkylation products thereof may be used in solution or suspension for dyeing and printing textiles, for example of mordanted cotton; leather; or articles such as fibers, flock, filaments, threads, sheets, films and spun goods of synthetic materials, for example of cellulose esters, cellulose ethers, polyamides, polyurethans or polyesters. Especially on articles of polyacrylonitrile or of copolymers containing acrylonitrile, they afford dyeings and prints in pure and very fast shades.

The following examples will further illustrate, but do not limit the invention. Unless otherwise specified, the parts and percentages specified in the examples are by weight. Parts by volume bear the same relation to parts by weight as the liter, measured under standard conditions, to the kilogram.

*Example 1*

A solution of 9 parts of 3-methylbenzothiazolone-(2)-hydrazone in 250 parts of 0.2 M aqueous hydrochloric acid and a solution of 13 parts of di-[benzimidazolyl-(2)]-methane in 100 parts of 0.1 M aqueous hydrochloric acid are brought together. Into this mixture, a mixture of 150 parts by volume of an aqueous 1 M ferric chloride solution and 150 parts by volume of a 50% aqueous sodium acetate solution is introduced gradually with stirring and external cooling. A yellow dye of the formula:

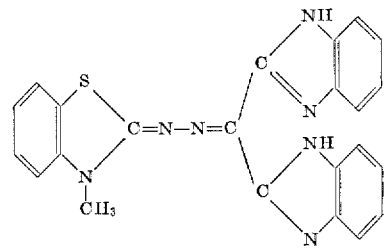

is obtained. The dye is filtered off by suction, washed with water, and dried. A yellow powder is obtained which dissolves in dimethylformamide giving a yellow color and dyes polyamide fibers in fast yellow shades. By using 10.5 parts of 6-methoxy-3-methyl-benzothiazolone-(2)-hydrazone instead of 9 parts of 3-methyl-benzothiazolone-(2)-hydrazone, an orange-colored coupling product of the formula:

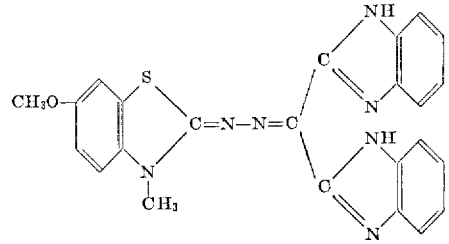

is obtained which has similar tinctorial properties.

*Example 2*

The dye obtained according to Example 1 is heated, with 500 parts by volume of chloroform, to 50° to 60° C. 6 parts of magnesium oxide and 30 parts by volume of dimethyl sulfate are added, and the whole is stirred at the said temperature until methylation is complete (which may be determined for example by chromatographic methods). Then the chloroform is distilled off, and 500 parts of 5% acetic acid are added at the same time. By adding 500 parts by volume of a saturated aqueous sodium chloride solution and 10 parts by volume of a 50% aqueous zinc chloride solution, a dye of the formula:

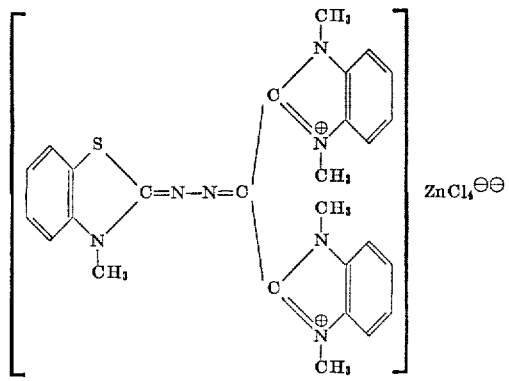

is precipitated as the tetrachlorozincate. The dye is filtered off by suction, washed with a small amount of water, and dried at 70° C. It is a yellow powder which dissolves in water giving a yellow color and dyes polyacrylonitrile fabric from an acetic acid or sulfuric acid bath in yellow shades. The dyeings obtained have excellent wet and light fastness.

An orange-colored methylation product of the formula:

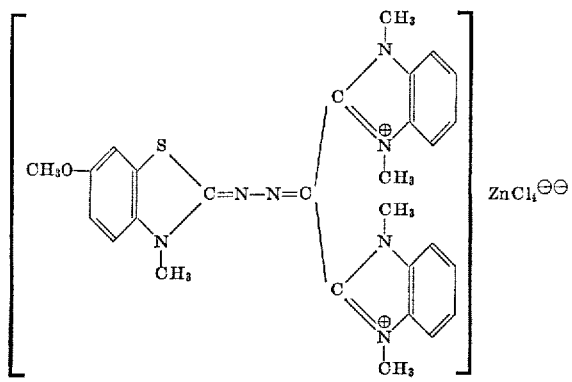

with similar properties is obtained by using 6-methoxy-3-methyl-benzothiazolone-(2)-hydrazone as the hydrazone component.

A further dye with similar properties is obtained by using diethyl sulfate instead of dimethyl sulfate. By using an aqueous solution of sodium perchlorate or sodium tetrafluoborate instead of the above-mentioned zinc chloride/sodium chloride solution, the perchlorates or tetrafluoborates of the said dyes are obtained.

*Example 3*

150 parts by volume of a 2 M aqueous ferric chloride solution are added, in the course of one hour, to a solution of 9 parts of 3-methylbenzothiazolone-(2)-hydrazone and 14 parts of di-[benzothiazolyl-(2)]-methane in 500 parts by volume of dimethylformamide. A dye of the formula:

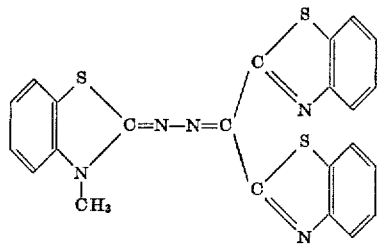

is precipitated. The dye is filtered off by suction, washed with water, and dried at 70° C. It is a yellow-brown powder which dissolves in dimethylformamide giving a yellow color and, when finely dispersed in a dyebath, dyes polyamide fabric in fast yellow shades.

*Example 4*

The whole of the dye obtained according to Example 3 is dissolved at 90° to 100° C. in 300 parts by volume of dimethylformamide. After adding 20 parts by volume of dimethyl sulfate, stirring is continued at the same temperature until methylation is complete. The reaction mixture is then introduced into 3000 parts of water, a dye of the formula

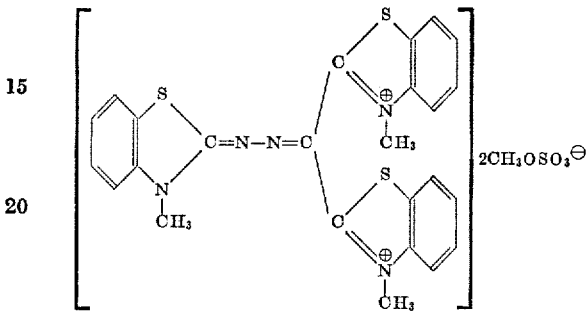

being precipitated. The dye is filtered off by suction, washed with water, and dried. It is a red-brown powder which dissolves in hot water or in 50% aqueous acetone giving an orange color and dyes polyacrylonitrile fibers from an acetic acid or sulfuric acid bath in scarlet shades of excellent light and wet fastness.

If 6-methoxy-3-methylbenzothiazolone-(2)-hydrazone is used as the hydrazone component, a dye of the formula:

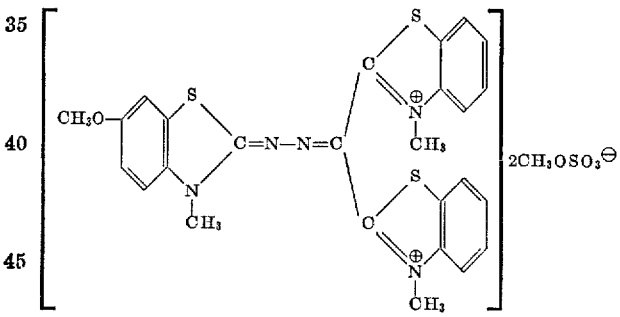

is obtained which gives dyeings in claret shades with similar fastness properties.

*Example 5*

A solution of 6 parts of 3-methyl-benzothiazolone-(2)-hydrazone in 15 parts by volume of concentrated hydrochloric acid and 150 parts of water and a solution of 14 parts of 3 - methyl - 2 - [benzothiazolyl - (2') - methyl]-benzothiazolium methosulfate in 100 parts of ethanol are brought together. At the same time, 120 parts by volume of a 2 M aqueous ferric chloride solution and 120 parts by volume of a 50% aqueous sodium acetate solution are allowed to flow into the mixture with external cooling. A dye of the formula:

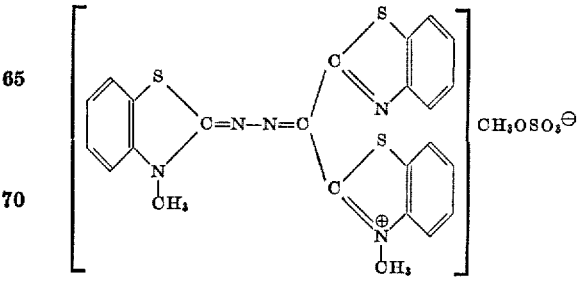

is precipitated. By isolation and drying, it is obtained as a brown powder which dissolves in a hot mixture of ethanol and water giving an orange color and dyes articles of polyacrylonitrile from an acetic acid bath in fast orange-colored shades.

*Example 6*

In the course of 30 to 40 minutes, 150 parts by volume of a 2 M aqueous ferric chloride solution and 150 parts by volume of a 50% aqueous sodium acetate solution are simultaneously added, at 0° to 5° C., to a solution of 9 parts of 3-methylbenzothiazolone-(2)-hydrazone and 13 parts of benzimidazolyl-(2)-benzothiazolyl-(2′)-methane in 500 parts of alcohol. The resultant coupling product is filtered off by suction and washed with water. The yellow powder obtained on drying is methylated as described in Example 2. The methylation product, which is obtained after water and acetic acid have been added and the chloroform has been distilled off, is a dye which is difficultly soluble in cold water and has the formula:

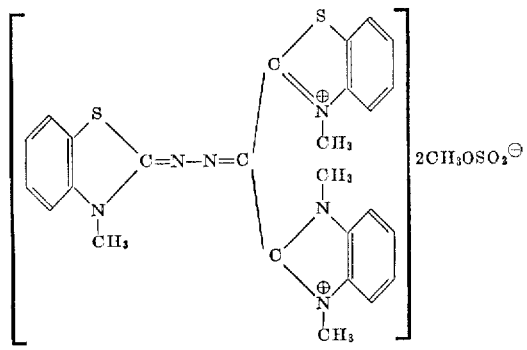

The dye is filtered off by suction and dried. It dissolves in hot water giving a yellow color and dyes polyacrylonitrile flock in yellow shades of excellent light and wet fastness.

*Example 7*

A solution of 9 parts of 3-methylbenzothiazolone-(2)-hydrazone, 17 parts of benzimidazolyl-(2)-3′-hydroxyquinoxalyl-(2′)-methane and 15 parts by volume of 10 M hydrochloric acid in 1300 parts by volume of ethanol is oxidatively coupled as described in Example 6, and the resultant product is methylated as described in Example 2. After working up, a yellow dye of the formula:

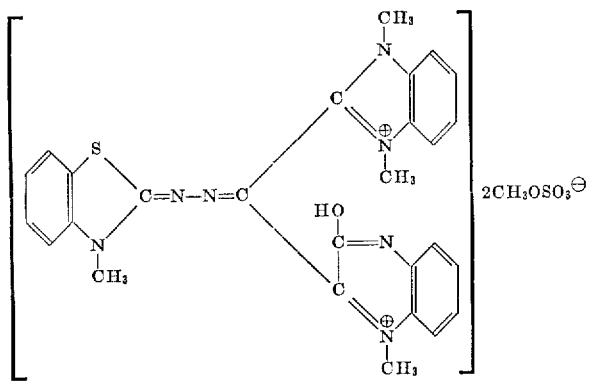

is obtained. It is difficultly soluble in cold water and dyes polyacrylonitrile flock in fast yellow shades.

*Example 8*

35 parts of a 40% solution of nitrosylsulfuric acid in concentrated sulfuric acid are slowly introduced, at 0° to 5° C., into a solution of 10 parts of 2-aminothiazole in 100 parts of 60% sulfuric acid. After stirring for three hours, 26 parts of di-[benzimidazolyl-(2)]-methane in 100 parts by volume of concentrated sulfuric acid at 0° to 10° C. are added to the diazo solution, while cooling with a freezing mixture, at 0° to 10° C. After stirring for 15 hours, the coupling mixture is introduced into a mixture of 133 parts by volume of 50% caustic soda solution and 1000 parts of ice. The precipitated dye is filtered off by suction and washed with water. The filtration residue is then stirred with a solution of 20 parts by volume of 25% aqueous ammonia in 1000 parts of water, filtered off by suction, washed with water, and dried. A yellow dye is obtained which has the formula:

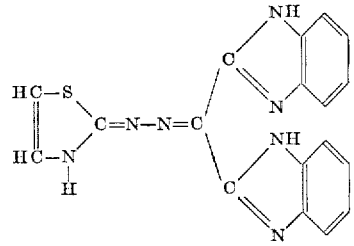

It dissolves in dimethylformamide giving a yellow color and, when finely dispersed in a dyebath, dyes polyacrylonitrile fibers from a sulfuric acid bath in fast yellow shades.

If 28 parts of di-[benzothiazolyl-(2)]-methane be used instead of 26 parts of di-[benzimidazolyl-(2)]-methane, a dye of the formula:

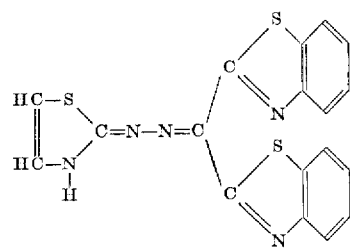

is obtained which has similar properties.

*Example 9*

The dye obtained according to Example 8 is dissolved in 1000 parts by volume of chloroform at 50° to 60° C., and 12 parts of magnesium oxide and 60 parts by volume of dimethyl sulfate are added. The mixture is stirred at this temperature until methylation is complete (which may be determined for example by paper-strip chromatography). The chloroform is then distilled off, and 3000 parts of 1% aqueous acetic acid are dripped in at the same time. The methylated dye is precipitated as the tetrachlorozincate by adding 50 parts by volume of a 50% aqueous zinc chloride solution and 3000 parts by volume of a saturated aqueous sodium chloride solution. The product is filtered off by suction, washed with saturated sodium chloride solution, and dried at 70° C. The dye is thus obtained in the form of a yellow powder and has the formula:

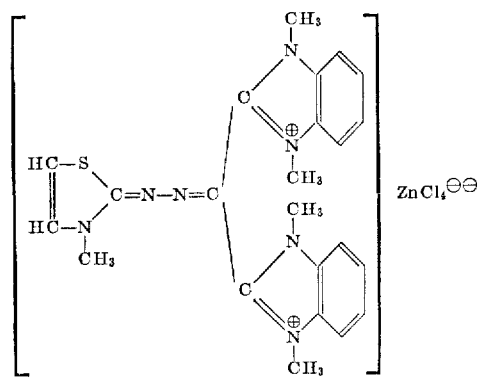

It dissolves in water giving a yellow color and dyes polyacrylonitrile fabric from an acetic acid or sulfuric acid bath in yellow shades of excellent wet and light fastness.

The iodide or nitrate of the said dye is obtained by using an aqueous solution of sodium iodide or sodium nitrate instead of the said sodium chloride/zinc chloride solution.

By using di-[benzothiazolyl-(2)]-methane as the coupling component, a red methylation product of the formula:

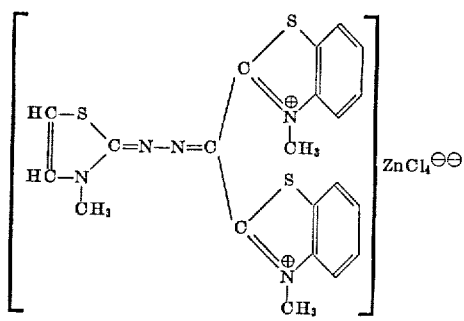

is obtained which has similar tinctorial properties.

*Example 10*

30 parts by volume of a 23% aqueous sodium nitrite solution are added, at 0° to 5° C., to a solution of 33 parts of 3-amino-5-chloroindazole in 25 parts by volume of concentrated aqueous hydrochloric acid and 250 parts of water. After diazotization is complete, a solution of 26 parts of di-[benzimidazolyl-(2)]-methane in a mixture of 24 parts of concentrated aqueous hydrochloric acid and 500 parts of water is added. After introducing 140 parts by volume of a 50% aqueous sodium acetate solution, the dye is filtered off by suction, washed with water, and dried at 70° C. It is a brown-yellow compound of the formula:

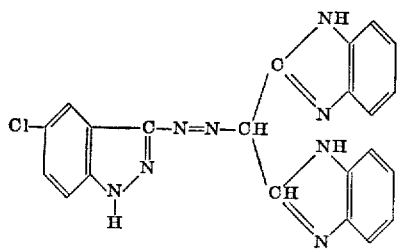

which dissolves in dimethylformamide giving a yellow color. By methylating the dye in the manner described in Example 9, a yellow water-soluble product is obtained which has the formula:

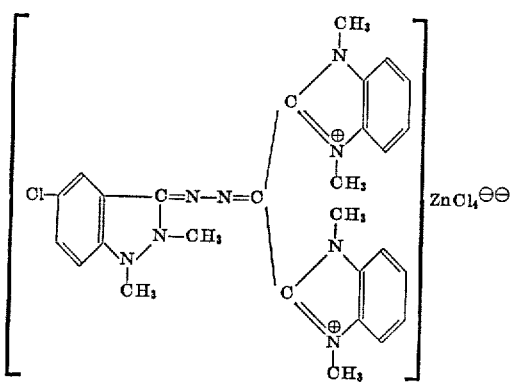

and dyes polyacrylonitrile fibers from an acetic acid or sulfuric acid bath in fast yellow shades.

*Example 11*

A diazo compound prepared from 18 parts of 2-amino-6-methoxybenzothiazole according to Example 8 is coupled with 26 parts of di-[benzimidazolyl-(2)]-methane as described in Example 10. A dye of the formula:

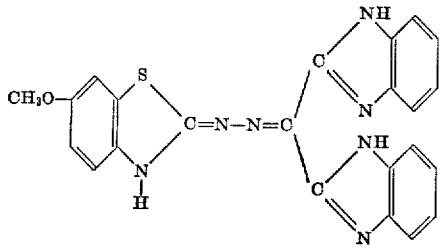

is obtained. It is a brownish-yellow powder which dissolves in dimethylformamide giving a red-yellow color and dyes polyacrylonitrile fabric fast yellow shades.

*Example 12*

The whole of the dye obtained according to Example 11 is reacted by the process of Example 9. A water-soluble orange-colored methylation product is obtained which is identical with the product described in the second paragraph of Example 2. It dyes polyacrylonitrile fabric fast orange-colored shades. If, in Example 11, 15 parts of 2-aminobenzothiazole be used instead of 18 parts of 2-amino-6-methoxybenzothiazole, a yellow methylation product with similar tinctorial properties is obtained. It is identical with the product described in the first paragraph of Example 2.

The following dyes are prepared in the same manner, using di-[benzimidazolyl-(2)]-methane as coupling component:

| Diazo component | Shade of methylation product on polyacrylonitrile fabric |
| --- | --- |
| 3-amino-5-phenyl-1,2,4-triazole | greenish-yellow. |
| 2-amio-n5-phenyl-1,3,4-thiodiazole | Do. |

*Example 13*

The diazo compound obtained from 33 parts of 3-amino-5-chloroindazole according to Example 10 is coupled, at 0° to 5° C., with 28 parts of di-[benzothiazolyl-(2)]-methane in 3000 parts by volume of dimethylformamide. The isolated yellow coupling product is methylated as described in Example 9. The reaction product has the formula:

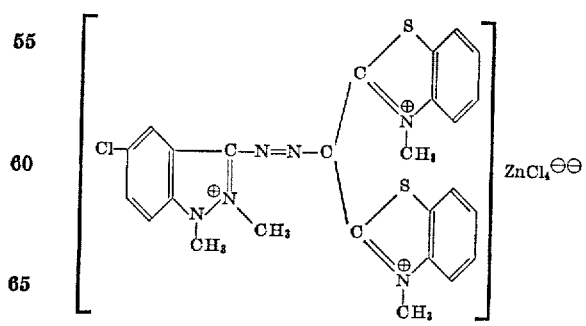

and is insoluble in chloroform. It dissolves in 80% aqueous acetone giving a red color and dyes cotton mordanted with tannic acid in bluish-red shades.

*Example 14*

30 parts by volume of a 23% aqueous sodium nitrite solution and 100 parts of ice are added to a solution of 13 parts of 3-amino-1,2,4-triazolecarboxylic acid-(5) in 6 parts by volume of a 50% aqueous caustic soda solution and 200 parts of water. 40 parts by volume of concentrated hydrochloric acid are introduced under the surface at 0° to 2° C. The diazo solution thus obtained is brought together, at 0° to 2° C., with a solution of 28 parts of di-[benzothiazolyl-(2)]-methane in 500 parts by volume of dimethylformamide. After filtration, the moist coupling product is gradually heated, while stirring, to 90° to 100° C. with 50 parts by volume of concentrated aqueous hydrochloric acid and 5000 parts of water for the purpose of decarboxylation. Stirring of the mixture is continued for another 30 minutes at the same temperature. The product is filtered off by suction while hot, and washed with water. The dried dye is methylated as described in Example 9. It is not, however, required to add zinc chloride solution to effect complete separation. The addition of only 1000 parts of sodium chloride solution is sufficient to completely precipitate the methylated dye which has the formula:

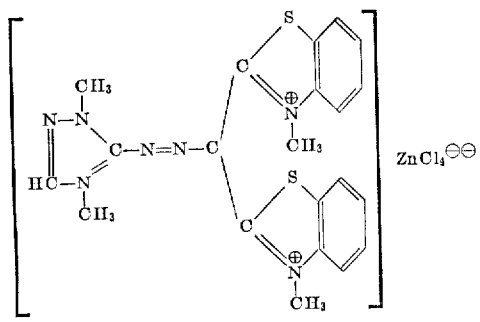

The dried dye dissolves in hot water giving a red-yellow color and dyes polyacrylonitrile flock in golden yellow shades.

I claim:
1. A dye of the formula

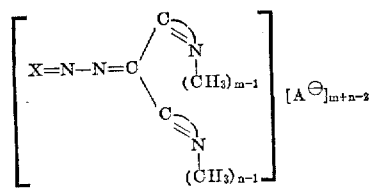

in which:
X represents a heterocyclic radical selected from the class consisting of 3-methyl-dihydrothiazolylidene-(2), 3-methyl-dihydrobenzothiazolylidene-(2), 3-methyl-6-methoxy - dihydrobenzothiazolylidene-(2), 2,4 - dimethyl-5-phenyl-dihydro-1,2,4-triazolylidene-(3), 3-methyl-5-phenyl - dihydro-1,3,4-thiodiazolylidene-(2), 2,4-dimethyl-dihydro-1,2,4-triazolylidene-(3), 1,2-dimethyl-5-chloro - dihydroindazolylidene-(3), 3-methyl-dihydro-1,3,4-oxadiazolylidene-(2), 1,2-dimethyl-dihydropyrazolylidene-(3), 1,4-dimethyl-dihydrotetrazolylidene-(5), 2 - methyl - dihydrocinnolinylidene-(3), 2-methyl-dihydropyridazinylidene-(3), 1,2 - dimethyl-dihydroindazolylidene - (3), 1-methyl-dihydroquinolinylidene-(2), the moiety

represents a heterocyclic radical selected from the class consisting of 1-methyl-benzimidazolyl-(2), benzothiazolyl-(2), 3-hydroxyquinoxalyl-(2), 1-phenyl-benzimidazolyl-(2), quinolyl-(2), pyridyl-(2), thiazolyl-(2), benzoxazolyl-(2), 1-methyl-5-chlorobenzimidazolyl-(2) and 1-methyl-perimidyl-(2);

$A^{\ominus}$ represents an anion selected from the class consisting of chloride, bromide, iodide, nitrate, perchlorate, sulfate, phosphate, tetrachlorozincate, tetrabromozincate, tetrafluoborate, toluenesulfonate, and methylsulfate; and
$m$ and $n$ each represent an integer of from 1 to 2.

2. A dye of the formula:

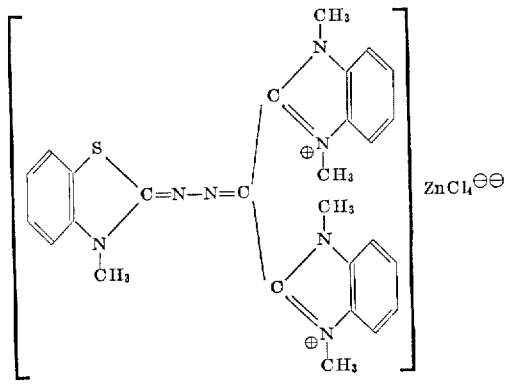

3. A dye of the formula:

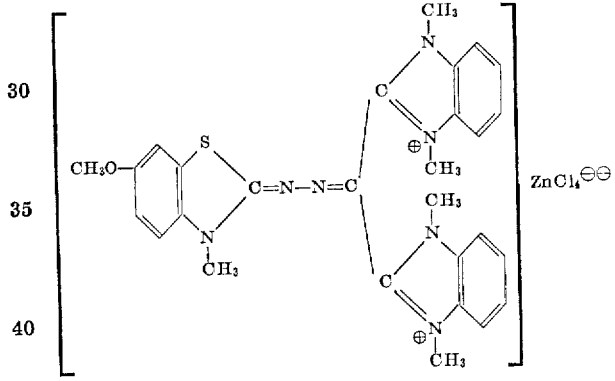

4. A dye of the formula:

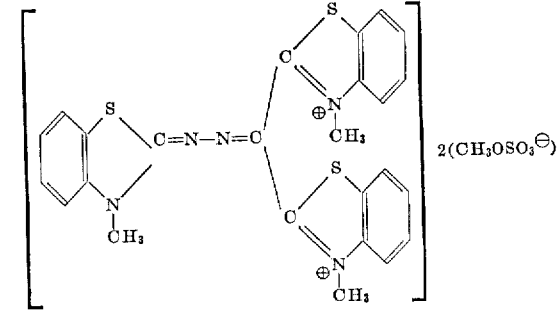

5. A dye of the formula:

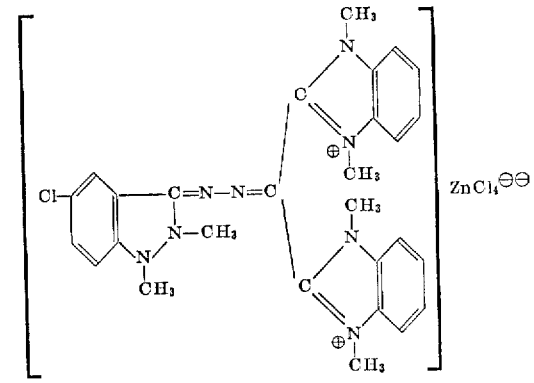

6. A dye of the formula:
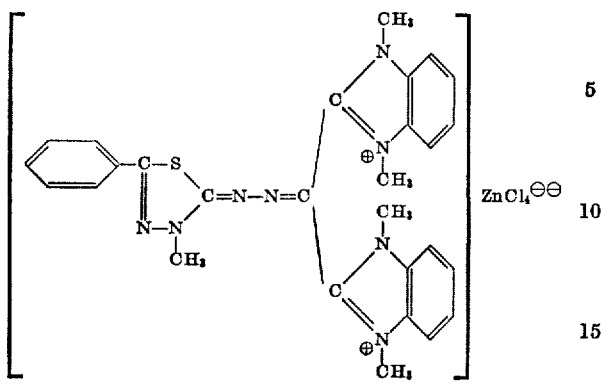
7. A dye of the formula:
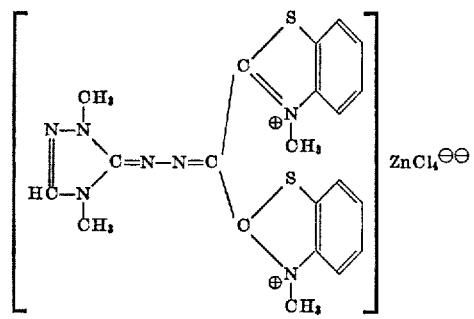
References Cited in the file of this patent
UNITED STATES PATENTS
| | | |
|---|---|---|
| 2,478,367 | Brooker et al. | Aug. 9, 1949 |
| 2,832,764 | Huenig | Apr. 29, 1958 |
| 2,913,303 | Baumann et al. | Nov. 17, 1959 |

UNITED STATES PATENT OFFICE
CERTIFICATE OF CORRECTION

Patent No. 3,096,338                      July 2, 1963

Johannes Dehnert

It is hereby certified that error appears in the above numbered patent requiring correction and that the said Letters Patent should read as corrected below.

Column 4, line 3, for "tetrafluoroborate" read -- tetrafluoborate --; column 7, lines 20 to 33, for that portion of the formula reading column 9, lines 39 to 49, the lower right-hand portion of the formula should appear as shown below instead of as in the patent:

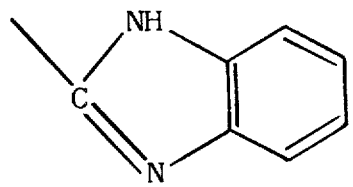

column 10, line 42, for "2-amio-n5-" read --- 2-amino-5- ---.

Signed and sealed this 19th day of May 1964.

(SEAL)
Attest:

ERNEST W. SWIDER  
Attesting Officer

EDWARD J. BRENNER  
Commissioner of Patents